United States Patent [19]
Freund

[11] Patent Number: 5,953,941
[45] Date of Patent: Sep. 21, 1999

[54] ANTITHEFT LOCK FOR AIRCRAFT AND AIRCRAFT AVIONICS

[76] Inventor: Stephen R. Freund, 2128 Hawley Dr., Vista, Calif. 92084

[21] Appl. No.: 09/096,224

[22] Filed: Jun. 11, 1998

Related U.S. Application Data

[60] Provisional application No. 60/049,472, Jun. 12, 1997.

[51] Int. Cl.[6] .............................. B65D 55/14; F16H 57/00
[52] U.S. Cl. ................................ 70/199; 70/200; 70/209; 70/14; 70/163; 244/224; 180/90
[58] Field of Search ..................... 70/198–200, 209–212, 70/237, 238, 225, 226, 14, 18, 158–176; 244/224; 180/90

[56] References Cited

U.S. PATENT DOCUMENTS

| | | | |
|---|---|---|---|
| D. 272,529 | 2/1984 | Marneris | D12/345 |
| 1,318,443 | 10/1919 | Gimperling . | |
| 1,538,936 | 5/1925 | Hess . | |
| 2,900,148 | 8/1959 | Nickels | 244/83 |
| 3,169,731 | 2/1965 | Phillips et al. | 244/83 |
| 3,348,391 | 10/1967 | Barnwell | 70/211 |
| 3,583,519 | 6/1971 | Meyer et al. | 70/237 X |
| 3,643,478 | 2/1972 | McPeake | 70/212 |
| 3,699,787 | 10/1972 | Corrado | 70/58 |
| 3,814,205 | 6/1974 | Miller | 180/90 |
| 3,833,190 | 9/1974 | Gaio | 244/83 A |
| 3,841,431 | 10/1974 | Russey | 180/90 |
| 3,898,823 | 8/1975 | Ludeman | 70/200 |
| 4,008,589 | 2/1977 | Harrell | 70/18 X |
| 4,041,738 | 8/1977 | Vann | 70/212 |
| 4,052,867 | 10/1977 | Faunce | 70/58 |
| 4,098,102 | 7/1978 | Kalina | 70/237 |
| 4,131,173 | 12/1978 | Boersma | 70/160 X |
| 4,134,279 | 1/1979 | Ross et al. | 70/18 |
| 4,208,026 | 6/1980 | Reynolds | 70/212 X |
| 4,228,974 | 10/1980 | Yates | 70/58 X |
| 4,299,361 | 11/1981 | Webb | 70/18 |
| 4,475,366 | 10/1984 | Marneris | 70/200 X |
| 4,549,625 | 10/1985 | Tindall | 180/90 |
| 4,888,968 | 12/1989 | Azvedo | 70/163 |
| 5,042,754 | 8/1991 | Heath | 70/58 |
| 5,082,213 | 1/1992 | Torres | 70/200 X |
| 5,582,363 | 12/1996 | Davis | 70/200 X |
| 5,713,539 | 2/1998 | Russ et al. | 70/200 X |

*Primary Examiner*—Suzanne Dino Barrett
*Attorney, Agent, or Firm*—Knobbe, Martens, Oloson & Bear, LLP

[57] ABSTRACT

A removable antitheft device inhibits theft of an aircraft and the avionics of an aircraft. The device includes a horizontal member having first and second ends. A first hook is positioned at the first end of the horizontal member. The first hook is sized to engage a first yoke shaft of an aircraft. A second hook at the second end of the horizontal member is sized to engage a second yoke shaft of the aircraft. The second hook is detachable from the horizontal member. A vertical barrier is mounted to the horizontal member and is positioned proximate to an avionics stack of the aircraft to block removal of avionics equipment from the avionics stack when the first and second hooks of the horizontal member are engaged with the first and second yoke shafts. The second hook is locked to the horizontal member after the second hook engages the second yoke shaft to prevent the second hook and the horizontal member from being removed from the second yoke shaft. The first hook includes at least first and second parallel curved portions which are spaced apart by a sufficient distance that the first and second portions inhibit full travel of the first yoke shaft. The antitheft device does not require any modification of the aircraft or the aircraft avionics.

15 Claims, 10 Drawing Sheets

FIG. 9

ANTITHEFT LOCK FOR AIRCRAFT AND AIRCRAFT AVIONICS

RELATED APPLICATION

This application claims the benefit of priority under 35 U.S.C. § 119(e) of U.S. Provisional Patent Application Ser. No. 60/049,472, filed on Jun. 12, 1997.

BACKGROUND OF THE INVENTION

1. Field of the Invention

The present invention pertains to the field of aircraft and avionics theft prevention, and, in particular, to devices which, when installed on an aircraft, prevent operation of the aircraft, and which impede or preclude removal of avionics from the instrument panel of an aircraft.

2. Description of the Related Art

Theft of General Aviation aircraft is rapidly increasing due to their attractiveness in transporting illegal drugs and other contraband. Because the value of the cargo is so high, aircraft are routinely stolen and are then abandoned after one flight.

Theft of aircraft avionics and instruments is also on the rise. Avionics are valuable. Often, particularly for older aircraft, the avionics in the aircraft are more valuable than the aircraft in which the avionics are installed. For example, the avionics in low-end aircraft such as the Cessna 172 can easily cost $30,000 per aircraft.

Avionics are easy to steal. Most aircraft tie-down areas, particularly at non-commercial airports, have no security personnel. Also, because aviation is a hobby for many owners, it is not unusual for people to be working around aircraft or carrying parts in the tie-down area. An experienced thief can readily blend into the normal activities in a tie down area. An aircraft by its very nature is designed to be as light as possible. When a thief has access to the aircraft, defeating the manufacturer's door locks to gain cabin access is relatively easy. In fact, many aircraft are produced without door locks. Typical avionics are mounted in a tray secured by fasteners on the front panel. Thus, once a thief has access to the cabin, the thief can remove the avionics quickly and easily.

Stolen avionics are also easy to sell. Avionics are high priced items in relatively small packages. There is a ready market for the avionics. Avionics are difficult to trace because serial numbers are not visible unless the unit is removed from the rack. It is a common practice for thieves to remove avionics from a first aircraft, install the stolen avionics on a second aircraft without the knowledge of the owner of the second aircraft, and then sell the avionics from the second aircraft on the open market. As far as the owner of the second aircraft is concerned, the original avionics are still in the second aircraft. Thus, the serial numbers of the avionics stolen from the second aircraft are not reported as being stolen so that even a sophisticated purchaser of the avionics from the second aircraft will not identify the avionics as being stolen. Meanwhile, although the serial numbers of the avionics from the first aircraft are listed in reports, the serial numbers remain hidden within the instrument panel of the second aircraft with little or no likelihood that even the owner of the second aircraft will know of the exchange of the avionics.

There have been several previously designed devices for aircraft security. One such device locks onto a wheel of the aircraft landing gear. The device offers protection from aircraft theft, but the device is bulky and is sufficiently heavy to significantly affect aircraft weight and balance when stowed. Furthermore, such devices offer no protection for the avionics. Aftermarket door locks are also available, but such door locks are generally ineffective because the doors and attachment points are necessarily light and easy to bend. Once the door is sprung, the avionics and the aircraft itself are unprotected. The prop lock is another previously designed device. A prop lock consists of a chain that is looped and locked around the propeller hub. A prop lock is easy to defeat with a bolt cutter and offers no avionics protection. A prop lock also presents a potential safety hazard if the aircraft is inadvertently started with the prop lock in place.

SUMMARY OF THE INVENTION

Briefly, and in general terms, the present invention is an aircraft security device. The device comprises a lockable assembly that attaches to the yoke shafts of an aircraft. The invention restricts movement of the yoke to thereby prevent operation of the aircraft so that the aircraft cannot be stolen by flying the aircraft. The device is also configured to support a barrier positioned in front of the avionics in the instrument panel of the aircraft to prevent removal of the avionics from the aircraft.

The present invention restricts yoke movement to prevent aircraft flight. The present invention is adjustable for use on various aircraft with different spacing between the left and right yoke shafts. The invention comprises a generally horizontal crossbar having a first yoke shaft hook at one end. The crossbar and the yoke shaft hook are formed of bar stock or cylindrical stock. The first yoke shaft hook attaches to one of the left yoke shaft or the right yoke shaft. The width of the first yoke shaft hook can be varied for different models of aircraft in accordance with the yoke travel of the aircraft. A second, removable yoke shaft hook is positioned at the opposite end of the crossbar for attachment to the other of the left yoke shaft or the right yoke shaft. An avionics barrier is positioned on the crossbar and has a position and dimensions selected in accordance with the location of the avionics and in accordance with the instrument configuration of particular aircraft types. The avionics barrier may be an open frame, or, in the alternative, may be covered with a grid or a mesh to further preclude access to the avionics. As a further alternative, the avionics barrier may comprise a solid panel. The present invention is advantageously fabricated from hardened or unhardened steel, aluminum, graphite, fiberglass, or any other material having a high strength to weight ratio. Preferably, the present invention is coated with a cushioning material (e.g., vinyl) to prevent damage to the instruments and the aircraft interior. The coating is advantageously a highly visible material, which serves as a visual deterrent. The present invention is advantageously used in conjunction with a commercially available lock, a custom designed lock, or a lock integral to the assembly so that once the invention is installed on the yoke shafts, the second yoke shaft hook is locked in place and cannot be removed until unlocked. On an aircraft with a gust lock hole on the yoke shaft, the present invention operates in combination with the gust lock to secure the gust lock in place. The present invention advantageously includes diagonal bracing between the avionics barrier and the cross bar for additional security.

One aspect of the present invention is a removable antitheft device for inhibiting theft of an aircraft and the avionics of an aircraft. The device comprises a horizontal member having first and second ends. A first hook is positioned at the first end of the horizontal member. The first hook is sized to engage a first yoke shaft of an aircraft. A second hook at the second end of the horizontal member is sized to engage a second yoke shaft of the aircraft. The second hook is detachable from the horizontal member. A vertical barrier is mounted to the horizontal member and is positioned proximate to an avionics stack of the aircraft to block removal of avionics equipment from the avionics stack when the first and second hooks of the horizontal member are engaged with the first and second yoke shafts. Preferably, the second hook is locked to the horizontal member after the second hook engages the second yoke shaft to prevent the second hook and the horizontal member from being removed from the second yoke shaft. In particular embodiments, the vertical barrier comprises an open frame. Preferably, the horizontal member comprises first and second parallel rods and a spacer between the rods. At least one end of at least one of the first and second rods is formed into the first hook. The first and second rods advantageously comprise hardened steel and the spacer advantageously comprises a steel plate. Preferably, the first hook includes at least first and second parallel curved portions, wherein the first and second portions are spaced apart by a sufficient distance that the first and second portions inhibit full travel of the first yoke shaft. In particular embodiments, the second hook selectively engages the horizontal support member at a first location or at a second location on the horizontal support member to selectively accommodate a first aircraft having a first distance between the first yoke shaft and the second yoke shaft or a second aircraft having a second distance between the first yoke shaft and the second yoke shaft.

Another aspect of the present invention is a removable antitheft device for inhibiting theft of an aircraft. The device comprises a horizontal member having a first end and a second end. A first hook at the first end of the horizontal member is sized to engage a first yoke shaft of an aircraft. A second hook at the second end of the horizontal member is sized to engage a second yoke shaft of the aircraft. The second hook is detachable from the horizontal member. At least one of the first hook and the second hook has a dimension in a direction parallel to the first yoke shaft or the second yoke shaft to preclude a substantial portion of the travel of the first yoke shaft or the second yoke shaft. Inhibiting the travel thereby inhibits free movement of a control surface controlled by the first yoke shaft or the second yoke shaft. In preferred embodiments, the device further includes a vertical barrier mounted to the horizontal member. The vertical barrier is positioned proximate to an avionics stack of the aircraft to block removal of avionics equipment from the avionics stack when the first and second hooks are engaged with the first and second yoke shafts. Preferably, the second hook is a removable hook which selectively engages the horizontal support member at a first location or at a second location on the horizontal support member to selectively accommodate a first aircraft having a first distance between the first yoke shaft and the second yoke shaft or a second aircraft having a second distance between the first yoke shaft and the second yoke shaft.

Another aspect of the present invention is an avionics antitheft device for an aircraft. The device comprises a horizontal support member secured at a first end to a left yoke shaft of an aircraft and secured at a second end to a right yoke shaft of an aircraft. The horizontal support member supports a barrier. The barrier is positioned on the horizontal support member at a location proximate to a radio stack in an instrument panel of the aircraft. The barrier is sized to block removal of an avionics enclosure from the radio stack. Preferably, the barrier comprises a frame which has a vertical dimension selected to extend to a top of the radio stack. The frame has at least one element aligned with the avionics enclosure. Preferably, the horizontal support member comprises a fixed hook at one of the first and second ends and a removable hook at the other of the first and second ends. The removable hook selectively engages the horizontal support member at a first location or at a second location on the horizontal support member to selectively accommodate a first aircraft having a first distance between the first yoke shaft and the second yoke shaft or a second aircraft having a second distance between the first yoke shaft and the second yoke shaft.

BRIEF DESCRIPTION OF THE DRAWINGS

The present invention will be described below in connection with the accompanying drawing figures in which.

DETAILED DESCRIPTION OF THE PREFERRED EMBODIMENT

As illustrated in FIGS. 1–4, an aircraft security device 100 in accordance with the present invention comprises a plurality of subassemblies. In particular, the device 100 comprises a main cross bar 110, an avionics/instrument barrier 112, a lock 114, a locking head 116 and a gust lock retainer 118. In the embodiment illustrated herein, the avionics/instrument barrier 112 is permanently affixed to the main cross bar 110.

Figure 1:
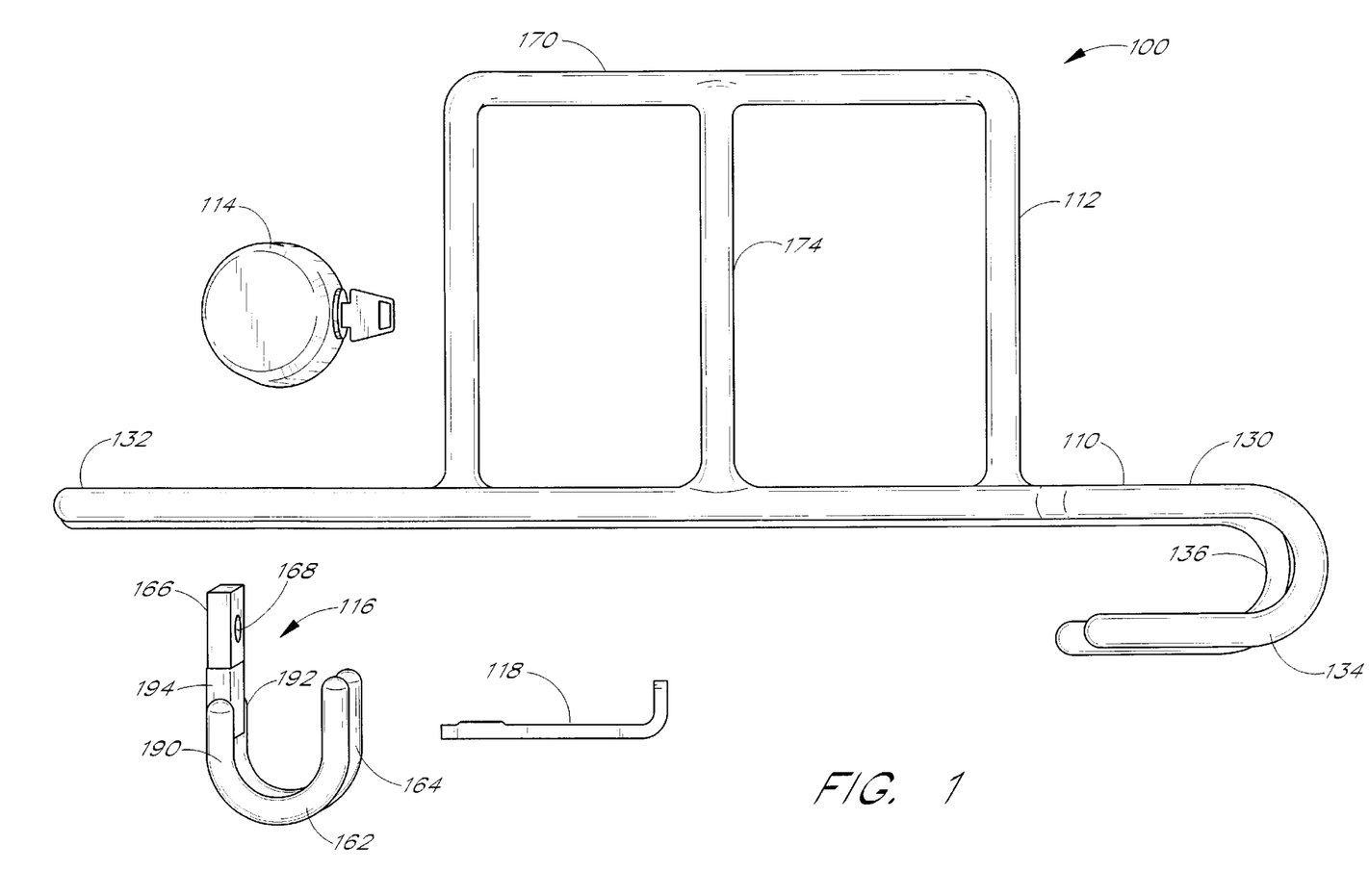
FIG. 1 illustrates a front perspective view of an aircraft security device in accordance with the present invention showing the individual subassemblies prior to installation on an aircraft.
Figure 2:
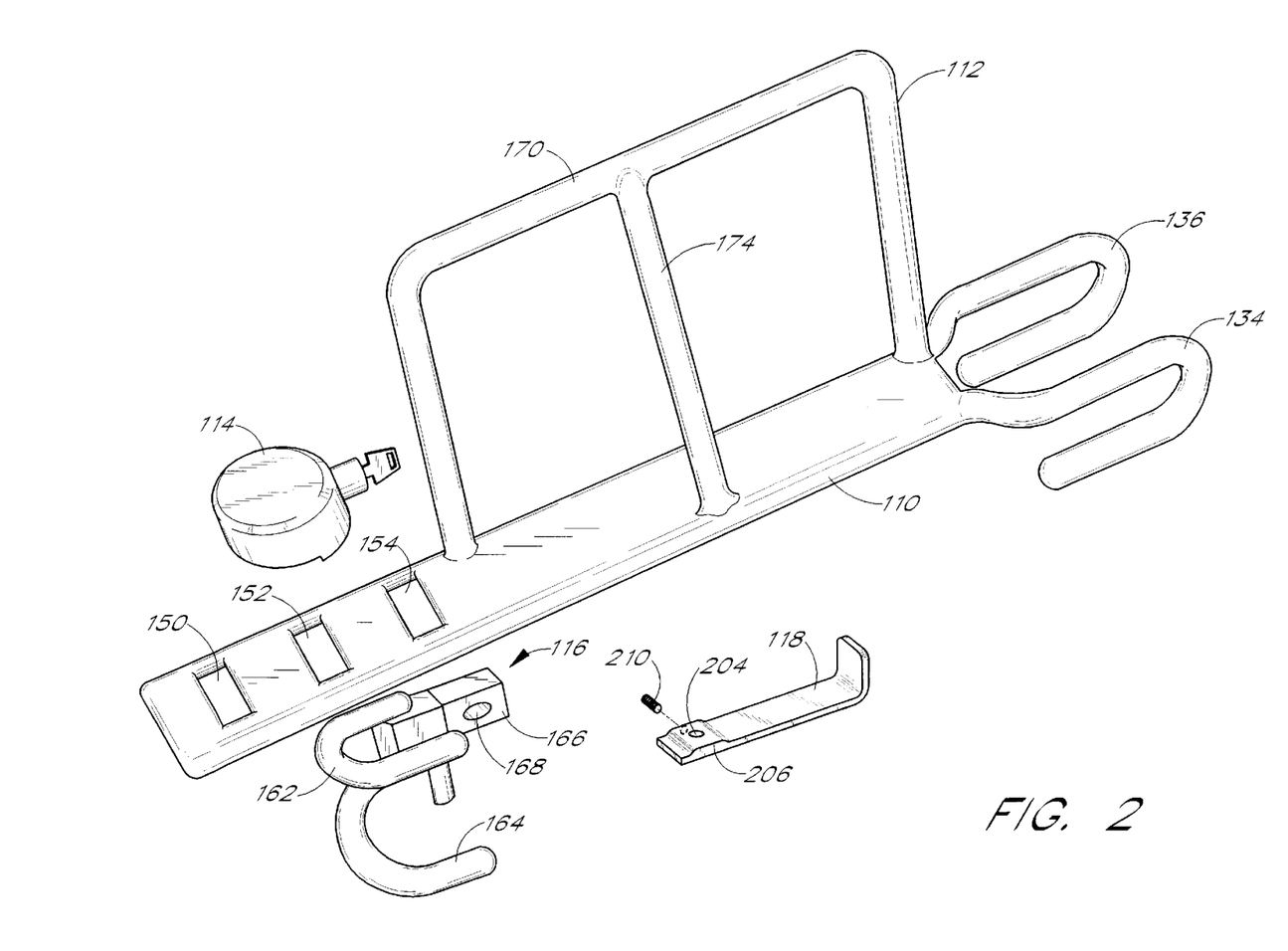
FIG. 2 illustrares a further perspective view of the subassemblies of FIG. 1.
Figure 3:
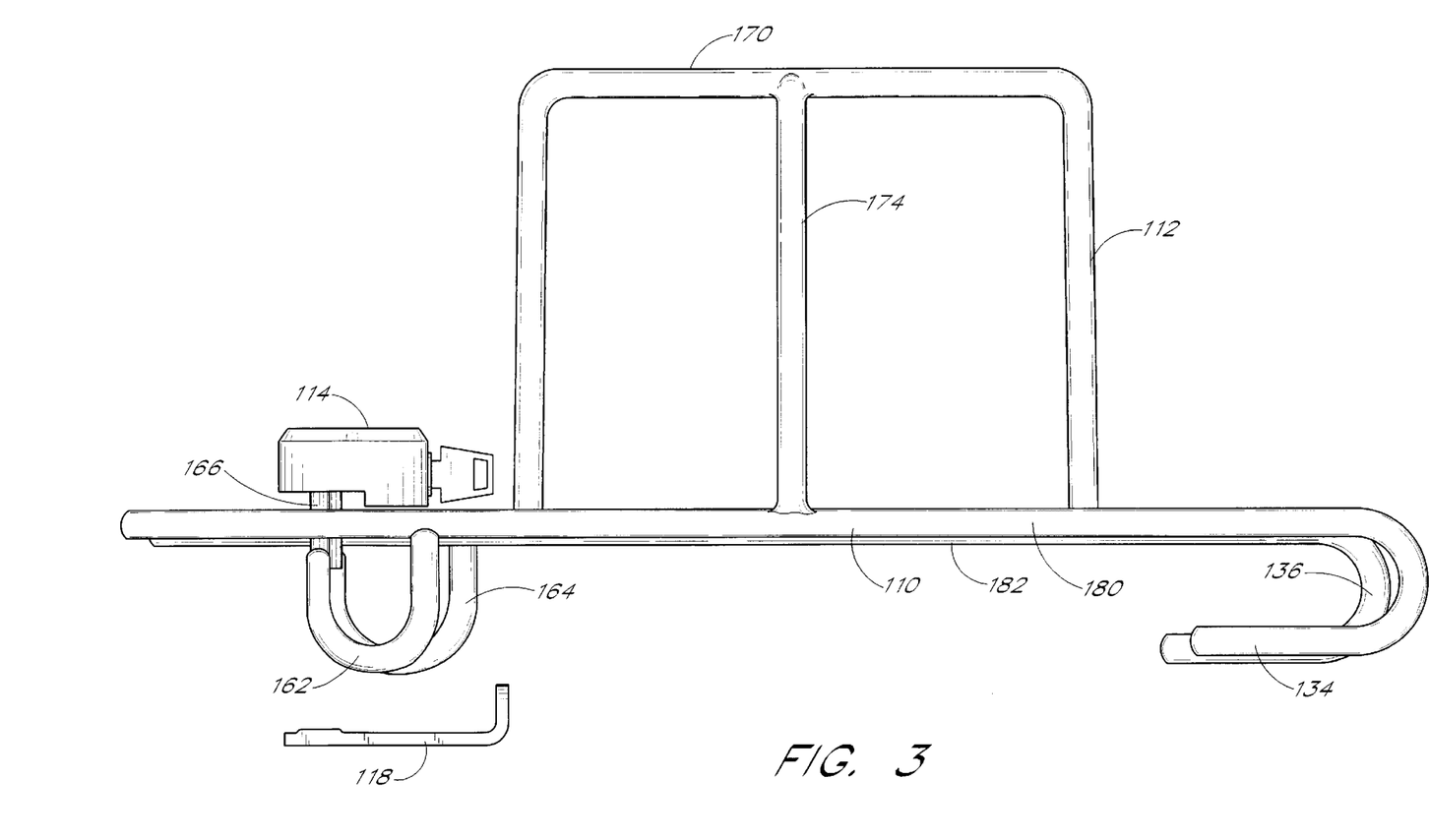
FIG. 3. illustrates a front perspective view of the subassemblies of FIGS. 1 and 2 interconnected, but not installed on an aircraft.
Figure 4:
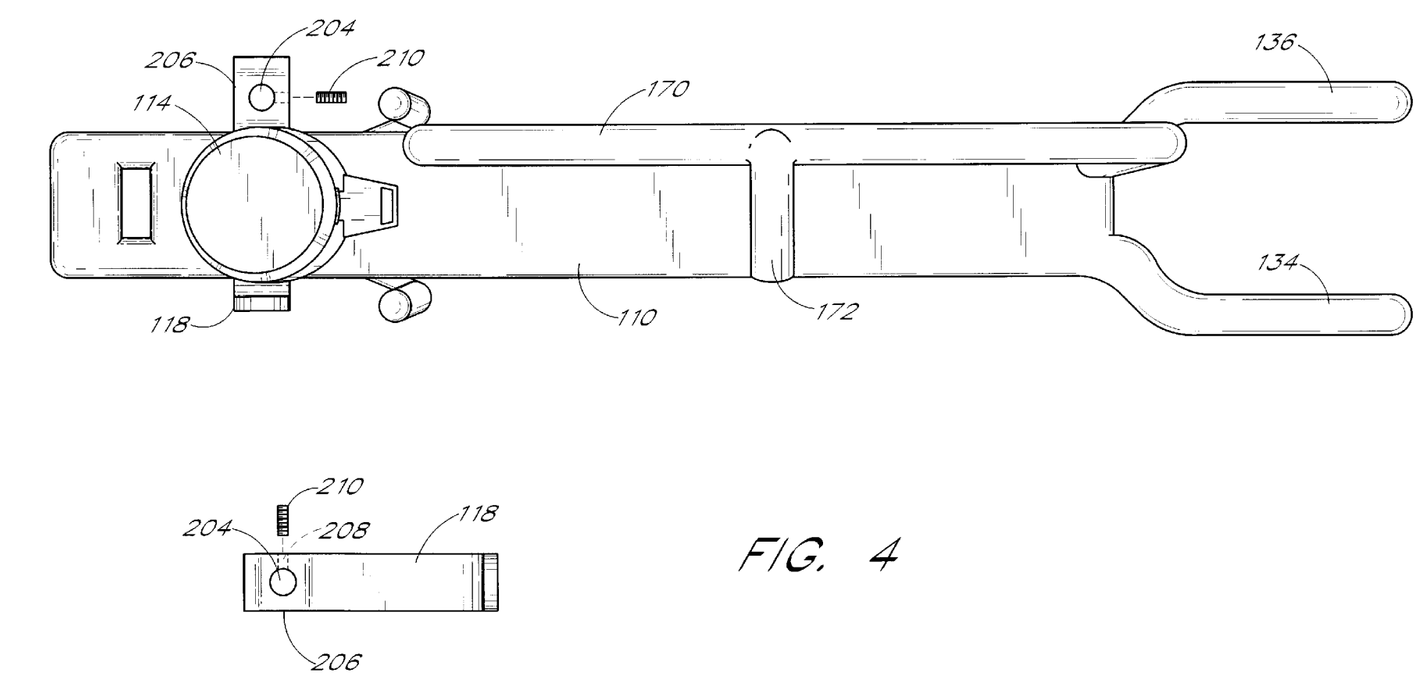
FIG. 4 illustrates a top plan view of the interconnected subassemblies of FIG. 3.
Figure 5:
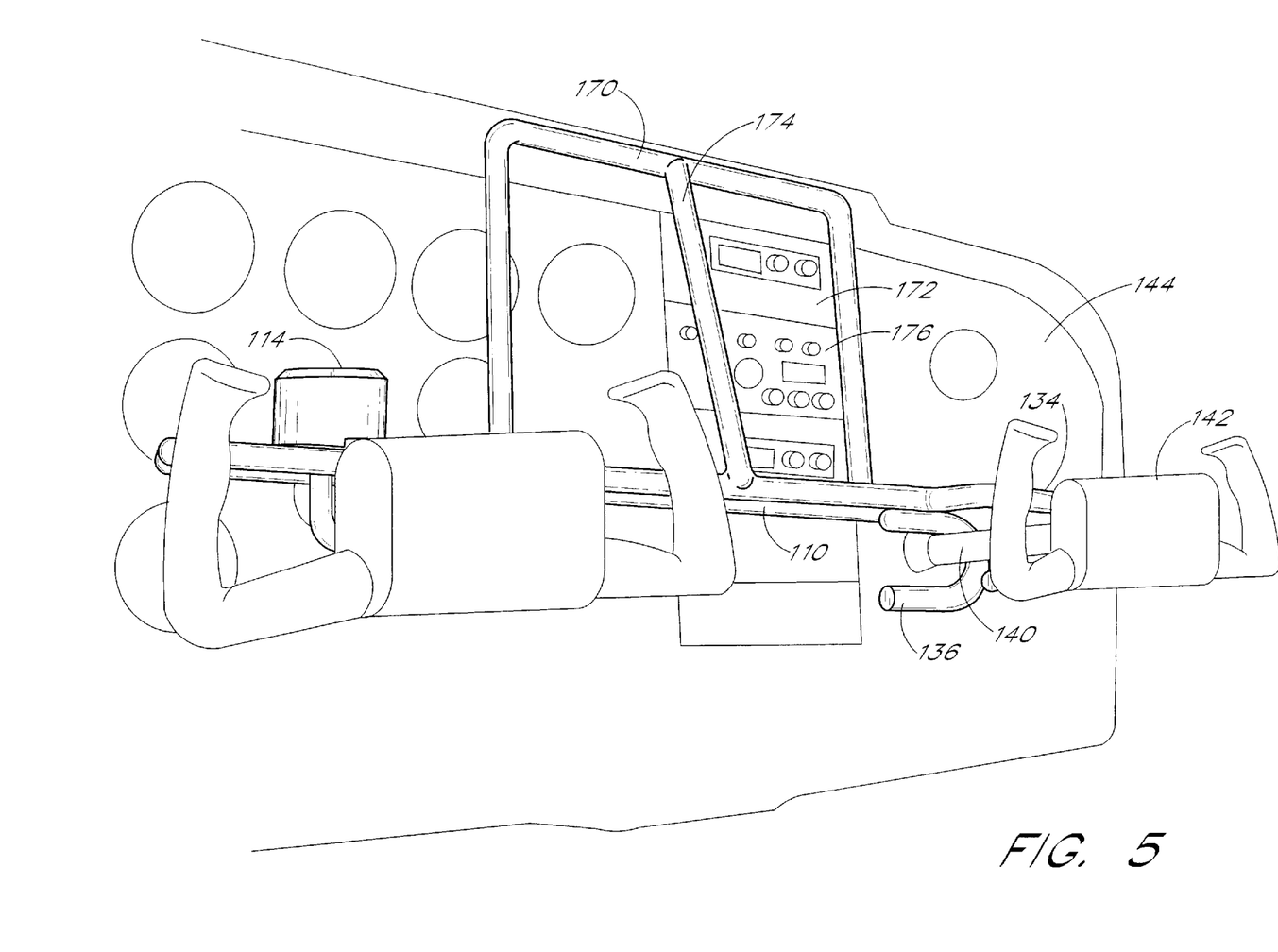
FIG. 5 illustrates a perspective view of the present invention installed on an exemplary aircraft.

The main cross bar 110 has a first end 130 and a second end 132. The first end 130 is formed into a first hook 134 and a second hook 136, which may also be considered as a single hook having a first leg 134 and a second leg 136. The hooks 134, 136 are sized (i.e., have a radius of curvature selected) to wrap around a yoke shaft (e.g., the right yoke shaft 140) on an a commercially available aircraft, such as, for example, a Cessna 172, or the like, as will be discussed below in connection with FIGS. 5 and 6. As best shown in FIGS. 2 and 4, the hooks 134, 136 are spaced apart from each other by a distance selected to be less than the distance between the extended yoke 142 of the aircraft and the instrument panel 144 of the aircraft. Thus, the hooks 134, 136 can be positioned on the yoke shaft 140 of the aircraft as shown in FIG. 5. Once positioned on the yoke shaft 140, the hooks 134, 136 inhibit the forward travel of the yoke 142 toward the instrument panel 144 of the aircraft. It should be understood that an aircraft with the forward travel of the yoke inhibited in this manner cannot be flown safely.

As shown in FIG. 2, the second end 132 of the main crossbar 110 includes a plurality of rectangular holes 150, 152, 154. The holes 150, 152, 154 permit the present invention to be adjusted to accommodate differences in spacing between the right yoke shaft 140 and the left yoke shaft 160 (see FIG. 10) of different manufacturers and models of aircraft. As will be discussed below, after the crossbar 110 is positioned in the aircraft, the locking head 116 is positioned in a selected one of the holes 150, 152, 154 to secure the locking head 116 and the crossbar 110 to the left yoke shaft 160 of the aircraft. In particular, the locking head 116 comprises a first hook 162 and a second hook 164, which extend below the crossbar 110. (The first hook 162 and the second hook 164 may also be considered to be a single hook having a first leg 162 and a second leg 164.) Each of the hooks 162, 164 has a radius of curvature similar to the radius of curvature of each of the hooks 134, 136 so that the hooks 162, 164 fit around the left yoke shaft 160. A top portion 166 of the locking head 116 extends through one of the rectangular holes 150, 152, 154 and is secured in place by the lock 114. As illustrated, the top portion 166 of the locking head 116 includes a hole 168 which is exposed above the crossbar 110. The lock 114 can be a conventional padlock having a shackle which can be inserted through the hole 166 to secure the locking head 116. In the preferred embodiment, the lock 114 is a commercially available toolbox lock (e.g., an American Lock Manufacturing Series 2000 (U.S. Pat. No. 3,769,821)) which fits over the top of the locking head. When the key of the lock 114 is inserted, the key and lock cylinder are pushed forward to cause an internal locking bolt to engage the hole 166 of the locking head 116. In further alternative embodiments (not shown), the locking head 116 can advantageously include an integral lock.

Figure 6:
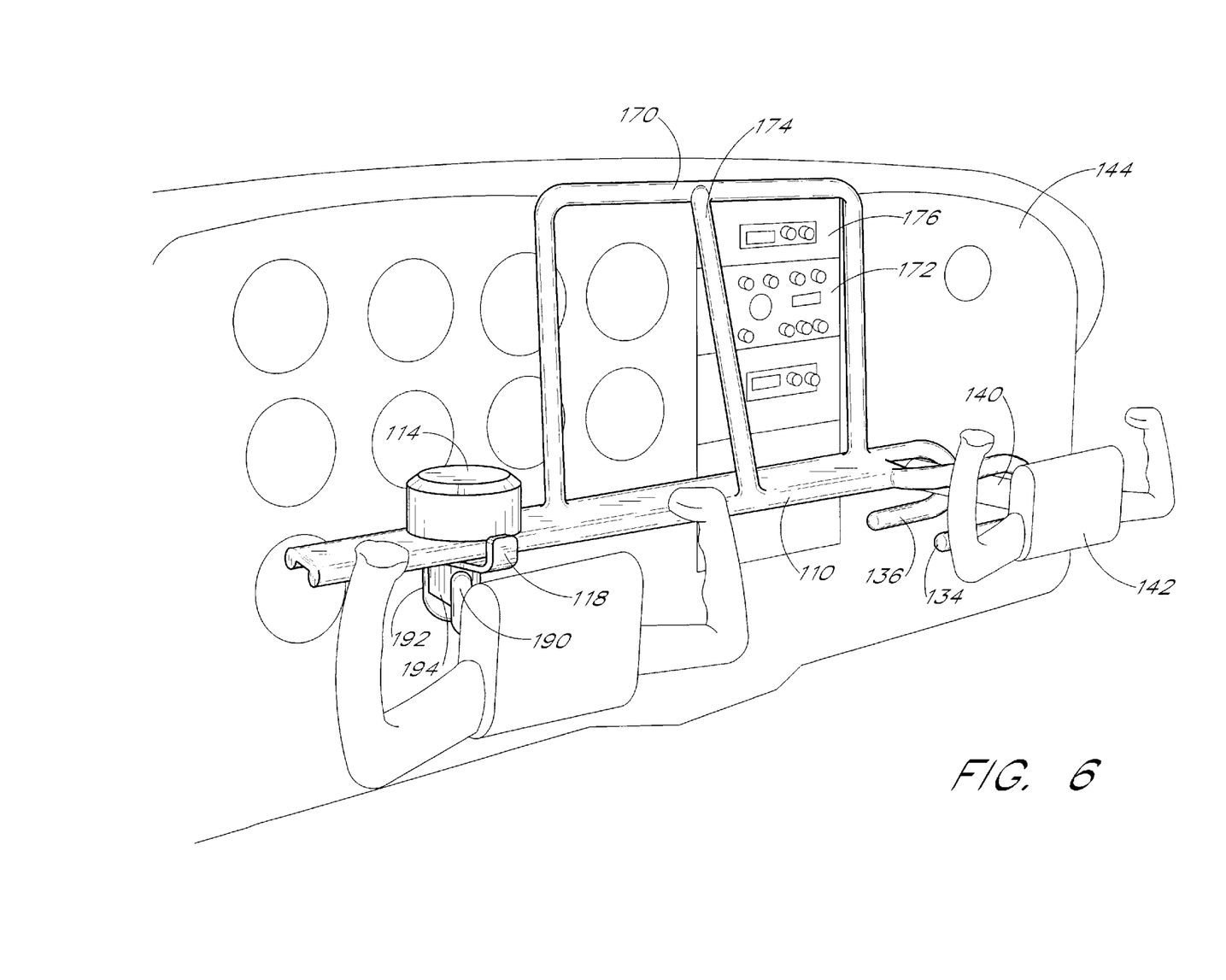
FIG. 6 illustrates a further perspective view of the present invention installed on an aircraft.
Figure 7:
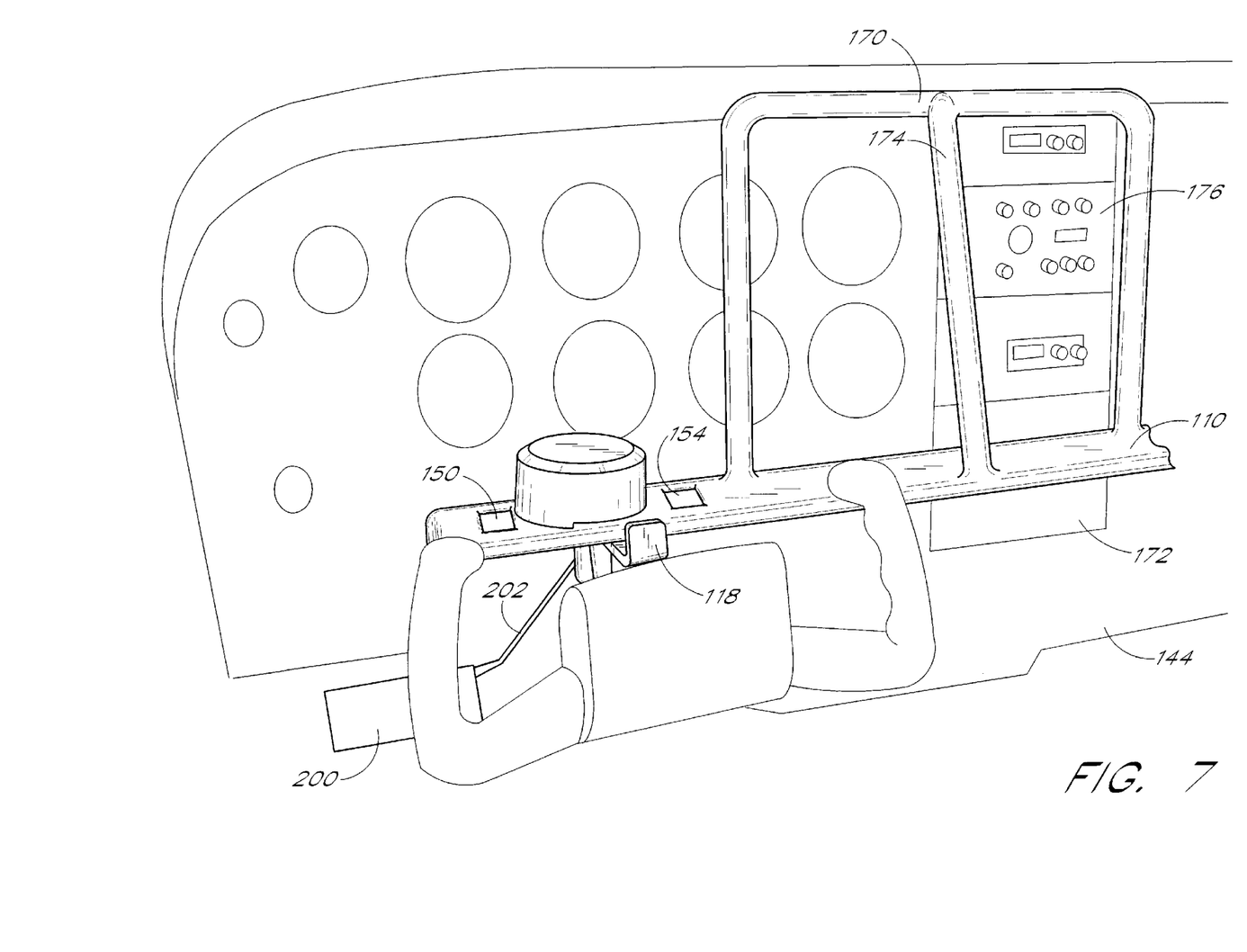
FIG. 7 illustrates an elevation view of the avionics barrier when installed on an aircraft.

The crossbar 110 serves as a platform for the attachment of the avionics/instrument barrier 112, which, in the illustrated embodiment, comprises a steel frame 170. The frame 170 has generally rectangular dimensions selected in accordance with the size and shape of the radio stack 172 (i.e., the vertical column of avionics instruments in a typical aircraft instrument panel 144 as illustrated in FIGS. 5, 6 and 7). For additional security, a bracing bar 174 is included to connect the top of the frame 170 to the cross bar in a buttress-like fashion so that the top of the frame 170 cannot be readily bent away from the instrument panel 144. By using the open frame 170, as illustrated by the preferred embodiment, the overall weight of the device 100 is minimized. Because a typical avionics enclosure 176 in an exemplary instrument panel must be removed by sliding the avionics enclosure in a direction substantially perpendicular to the surface of the instrument panel 144, the avionics enclosure 176 cannot be rotated to pass through between the vertical portions of the barrier 170. Thus, it is not necessary for the barrier 170 to be solid in the preferred embodiment. However, in alternative embodiments, to further preclude tampering with the avionics in the stack 172, the spaces between the frame 170 and the bracing bar 174 may be filled with a solid or mesh material (not shown). Although not shown in the illustrated embodiment, the frame 112 may advantageously include a second portion which extends below the crossbar 110 to protect avionics in the radio stack 172 which are positioned below the crossbar 110.

In the preferred embodiment, the crossbar 110, the barrier 112 and the locking head 116 are fabricated in a conventional manner from hardened or unhardened steel, aluminum, graphite, fiberglass or any other material with a high strength to weight ratio. It should be understood that the purpose of the present invention is to deter an opportunistic thief from breaking into an aircraft and quickly removing the avionics or stealing the aircraft. Thus, in some locations, a lower strength material (e.g., aluminum or fiberglass) may be adequate. In other locations (e.g., isolated airports), hardened steel or the like may be desirable to increase the amount of time required for a thief to cut through the crossbar 110, the barrier 112 or the locking head 116.

Figure 8:
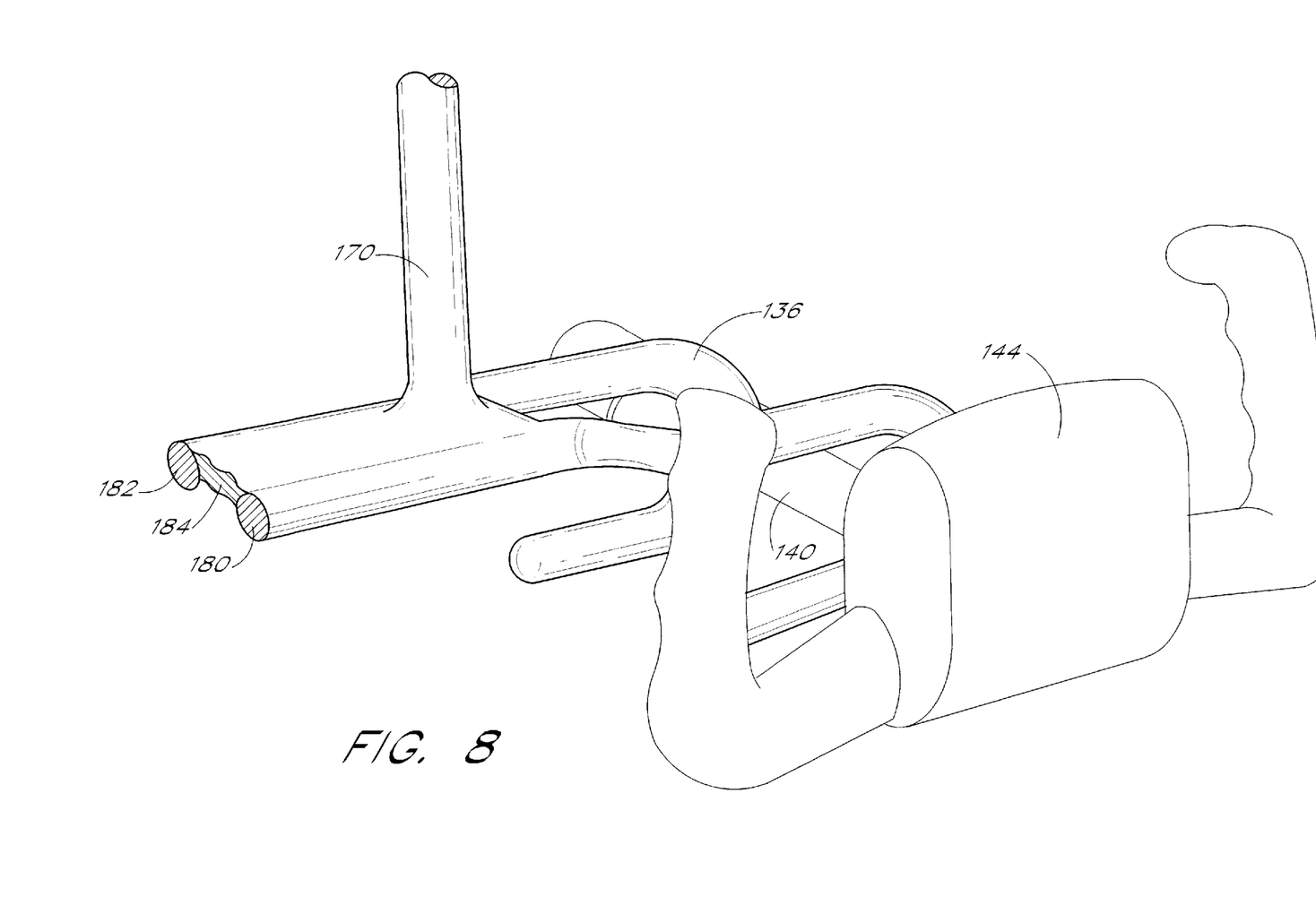
FIG. 8 illustrates an enlarged view of the hook at the right end of the main crossbar when installed on an aircraft.
Figure 9:
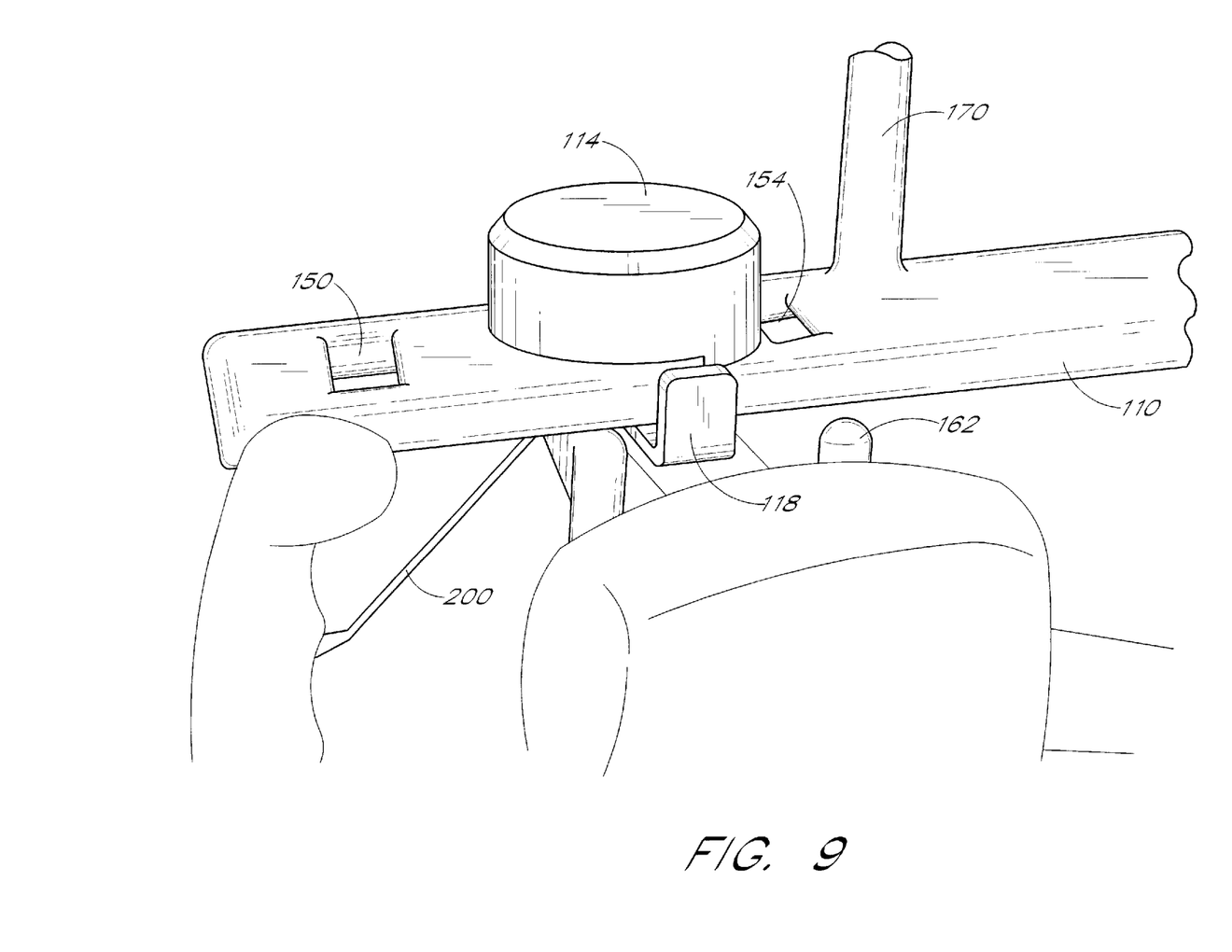
FIG. 9 illustrates an enlarged view of the lock assembly at the left end of the main crossbar when installed on an aircraft.

In the illustrated embodiment, the crossbar 116 comprises first and second parallel rods 180, 182 which are spaced apart by a spacer 184 comprising a flat plate of sheet steel or other suitable material, as shown in partial cross section in FIG. 8. One end of each of the rods 180, 182 is formed into a respective one of the hooks 134, 136. The frame 170 and the bracing bar 172 of the barrier 112 and similarly fabricated from hardened steel rods or the like. In the preferred embodiment fabricated from hardened steel, the rods 180, 182, the spacer 184, the frame 170 and the bracing bar 172 are welded together by conventional methods. Other well-known fabrication methods may be advantageously used with other materials.

Note that the rectangular holes 150, 152, 154 can be formed in the spacer 184, or, in the alternative, the spacer 184 advantageously comprises one longer sheet of steel and three shorter sheets of steel with the sheets of steel spaced apart to form the holes as shown. Preferably, after fabrication, the entire assembly is coated with bright red vinyl, or another suitable coating material, to provide cushioning to avoid damage to the interior of the aircraft. A brightly colored coating also makes the assembly easy to spot by a prospective thief such that an opportunistic thief is not likely to bother breaking into the aircraft protected by the present invention.

The locking head 116 comprises a pair of curved rods 190, 192 which are formed as the hooks 162, 164 at respective first ends, and which are attached (e.g., welded) at respective second ends to a solid, generally rectangular block (or tab) 194 of corresponding material (e.g., hardened steel). The solid block 194 forms the top portion 166 and has the hole 168 formed therein. The exposed portions of the locking head 116 (e.g., the rods 190, 192 and the lower portion of the solid block 194) are also coated with red vinyl or the like.

Figure 10:
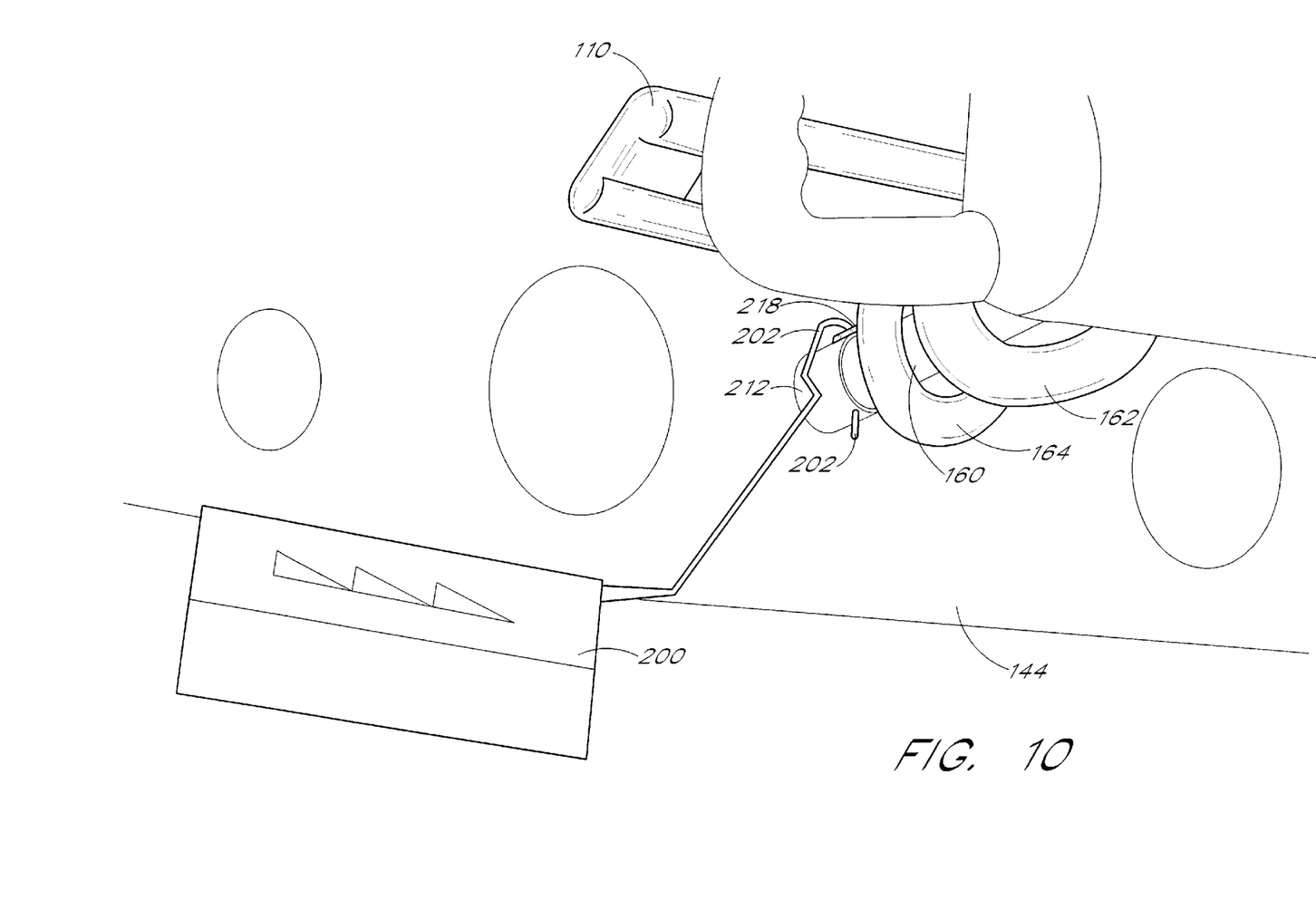
FIG. 10 illustrates an enlarged view of the lock assembly showing the constraint of the gust lock by the gust lock retainer.

The gust lock retainer 118 is an accessory applicable to some models of aircraft (e.g., a Cessna 172). As shown in FIG. 10, the gust lock retainer 118 is attached to an aircraft gust lock 200 and keeps the gust lock 200 from being removed when the aircraft security device 100 is in place to thereby effectively prevent the aircraft from being stolen. The gust lock retainer 118 is attached to the gust lock 200 of the aircraft by sliding an engagement portion 202 of the gust lock 200 through an unthreaded hole 204 in the gust lock retainer 118. A captive shaft collar 206 surrounds the unthreaded hole 204. The shaft collar 206 has a threaded hole 208 formed therein at right angles to the unthreaded hole 204. A setscrew 210 is inserted into the threaded hole 208 and is tightened to engage the engagement portion 202 of the gust lock 200 so that the gust lock 200 cannot be readily removed from the gust lock retainer 118. As shown in FIG. 10, the engagement portion 202 of the gust lock 200 is then positioned through a hole (not shown) in the left yoke shaft 160 and the collar 212 surrounding the left yoke shaft 160. When the device 100 is assembled, as illustrated in FIG. 7, for example, the gust lock retainer 118 is constrained between the left yoke shaft 160 and the bottom of the crossbar 110 so that the gust lock retainer 118, and thus the gust lock 200, cannot be removed. Thus, since the gust lock 200 precludes forward and reverse movement as well as rotational movement of the left yoke shaft 160, the elevator and ailerons of the aircraft are effectively disabled, thus rendering the aircraft unflyable.

FIGS. 5–10 illustrate the aircraft security device 100 installed in a typical Cessna 172. In use, the hooks 134, 136 of the main cross bar 110 are hooked over one of the yoke shafts (e.g., the right yoke shaft 140) and the other end of the main cross bar is laid across the other yoke shaft (e.g., the left yoke shaft 160). The locking head 116 is installed from below by placing the hooks 162, 164 around the left yoke shaft 160 and by inserting the top (or tab) portion 166 of the steel block 194 through one of the rectangular holes in the main cross bar 110 closest to the yoke shaft 160 (e.g., the hole 152 in the illustrated embodiment). The lock 114 is then placed over the protruding tab 194 and locked in place. As discussed above, if the aircraft is provided with a gust lock 200, the gust lock 200, with the gust lock retainer 118 attached, is inserted in accordance with the aircraft manufacturer's instructions. In the illustrated embodiment, the gust lock retainer 118 is positioned on top of and parallel to the left yoke shaft 160, and the aircraft security device 100 is installed over the gust lock retainer 118, as described above. Provision can easily be made for other gust lock configurations and aircraft.

In other embodiments, the locking head 118 can be advantageously reconfigured for use as a stand alone aircraft anti-theft device by providing a configuration of sufficient width and by encircling either the right yoke shaft 140 or the left yoke shaft 160 to restrict movement of the flight controls, thus causing the aircraft to be unflyable.

In another embodiment, the main cross bar 110 can be fabricated with a bar or bracket that attaches to parts of the aircraft other than a yoke shaft, for example, the throttle levers, the rudder pedals or the seat assemblies.

A strap assembly can be provided to completely immobilize the controls and serve as a gust lock on aircraft that do not have provision for a gust lock.

From the foregoing description, it should be understood that no modifications to the aircraft or the avionics are required in order to utilize the present invention.

Although the invention has been described in terms of the preferred embodiment, many variations will be apparent to those skilled in the art. All such variations are intended to be included within the appended claims.

What is claimed is:

1. A removable antitheft device for inhibiting theft of an aircraft and the avionics of an aircraft, said device comprising:

a horizontal member having first and second ends;
   a first generally J-shaped hook at said first end of said horizontal member, said first hook sized to engage a first yoke shaft of an aircraft, said horizontal member having a length between said first and second ends such that said second end of said horizontal member extends at least to a second yoke shaft of said aircraft when said first hook is engaged with said first yoke shaft;
   a second generally J-shaped hook sized to engage said second yoke shaft of said aircraft, said second hook removably engaging with said horizontal member proximate to said second end, said second hook adapted to be locked to said horizontal member; and
   a vertical barrier mounted to said horizontal member, said vertical barrier positioned proximate to an avionics stack of said aircraft to block removal of avionics equipment from said avionics stack when said first and second hooks of said horizontal member are engaged with said first and second yoke shafts.

2. The device as defined in claim 1, wherein said second hook is locked to said horizontal member after said second hook engages said second yoke shaft to prevent said second hook and said horizontal member from being removed from said second yoke shaft.

3. The device as defined in claim 1, wherein said vertical barrier comprises an open frame.

4. The device as defined in claim 1, wherein said horizontal member and said first and second hooks comprise hardened steel.

5. The device as defined in claim 1, wherein said horizontal member comprises first and second parallel rods and a spacer between said rods, at least one end of at least one of said first and second rods formed into said first hook.

6. The device as defined in claim 5, wherein said first and second rods comprise hardened steel and said spacer comprises a steel plate.

7. The device as defined in claim 1, wherein said first hook includes at least first and second parallel curved portions, said first and second portions spaced apart by a sufficient distance that said first and second portions inhibit full travel of said first yoke shaft.

8. The device as defined in claim 1, wherein said second hook selectively engages said horizontal support member at a first location or at a second location on said horizontal support member to selectively accommodate a first aircraft having a first distance between said first yoke shaft and said second yoke shaft or a second aircraft having a second distance between said first yoke shaft and said second yoke shaft.

9. A removable antitheft device for inhibiting theft of an aircraft, said device comprising:

a horizontal member having a first end and a second end;
   a first generally J-shaped hook at said first end of said horizontal member, said first hook sized to engage a first yoke shaft of an aircraft said horizontal member having a length between said first and second ends such that said second end of said horizontal member extends at least to a second yoke shaft of said aircraft when said first hook is engaged with said first yoke shaft; and
   a second generally J-shaped hook sized to engage said second yoke shaft of said aircraft, said second hook removably engaging with said horizontal member proximate to said second end, said second hook adapted to be locked to said horizontal member,
   at least one of said first hook and said second hook having a dimension in a direction parallel to said first yoke shaft or said second yoke shaft to preclude a substantial portion of the travel of said first yoke shaft or said second yoke shaft, to thereby inhibit free movement of a control surface controlled by said first yoke shaft or said second yoke shaft.

10. The device as defined in claim 9, further including an open-framed vertical barrier mounted to said horizontal member, said vertical barrier positioned proximate to an avionics stack of said aircraft to block removal of avionics equipment from said avionics stack when said first and second hooks are engaged with said first and second yoke shafts.

11. The device as defined in claim 9, wherein said second hook is a removable hook which selectively engages said horizontal support member at a first location or at a second location on said horizontal support member to selectively accommodate a first aircraft having a first distance between said first yoke shaft and said second yoke shaft or a second aircraft having a second distance between said first yoke shaft and said second yoke shaft.

12. An avionics antitheft device for an aircraft, comprising:
 a horizontal support member secured at a first end to a left yoke shaft of an aircraft and secured at a second end to a right yoke shaft of an aircraft; and
 an open-framed barrier supported by said horizontal support member, said barrier comprising at least first and second generally vertical members having an unobstructed area therebetween, said barrier positioned on said horizontal support member at a location proximate to a radio stack in an instrument panel of said aircraft, said vertical members of said barrier being spaced sufficiently close to each other to block removal of an avionics enclosure from said radio stack and being spaced sufficiently apart from each other to permit at least a portion of said radio stack to be viewed between said vertical members.

13. The avionics antitheft device as defined in claim 12, wherein said open-framed barrier has a vertical dimension selected to extend to a top of said radio stack, said barrier having at least one element aligned with said avionics enclosure.

14. The avionics antitheft device as defined in claim 12, wherein said horizontal support member comprises a fixed, generally J-shaped hook at one of said first and second ends and a removable, generally J-shaped hook at the other of said first and second ends.

15. The avionics antitheft device as defined in claim 14, wherein said removable hook selectively engages said horizontal support member at a first location or at a second location on said horizontal support member to selectively accommodate a first aircraft having a first distance between said first yoke shaft and said second yoke shaft or a second aircraft having a second distance between said first yoke shaft and said second yoke shaft.

* * * * *